United States Patent [19]

Okada et al.

[11] 4,207,435
[45] Jun. 10, 1980

[54] CHANNEL TRANSLATORS FOR USE IN TIME DIVISION DIGITAL EXCHANGERS

[75] Inventors: Keiji Okada, Nagasaki; Kohei Habara, Kokubunji, both of Japan

[73] Assignee: Nippon Telegraph & Telephone Public Corporation, Japan

[21] Appl. No.: 932,134

[22] Filed: Aug. 8, 1978

[30] Foreign Application Priority Data

Aug. 8, 1977 [JP] Japan .................................. 52-94821

[51] Int. Cl.² ............................................ H04Q 11/04
[52] U.S. Cl. .................................................... 370/68
[58] Field of Search ................................... 179/15 AQ

[56] References Cited

U.S. PATENT DOCUMENTS

| | | | |
|---|---|---|---|
| 3,967,070 | 6/1976 | Srivastava et al. | 179/15 AT |
| 4,071,703 | 1/1978 | Schaffter | 179/15 AQ |
| 4,074,072 | 2/1978 | Christensen et al. | 179/15 AQ |

*Primary Examiner*—Thomas W. Brown

*Attorney, Agent, or Firm*—Claude A. S. Hamrick

[57] ABSTRACT

PCM 24 channel digital voice information received from an incoming trunk are sequentially stored in a speech data memory device for respective channels through an input buffer memory device. The addressed content of the speech data memory device is read out by a control signal which has been stored in a control memory device and adapted to designate an address of the speech data memory device from which information is to be read out, and the read out information is sent to an outgoing trunk through an output buffer memory device thereby operating channel translation. The channel assigned to the outgoing trunk is different from that assigned to the incoming trunk. The speech data memory device, the control memory device and the program memory device are constituted by one memory means and the exchange of signals between the memory means and the input/output buffer memory devices as well as an arithmetic operation unit is effected by a programmed control of a program memory device.

8 Claims, 10 Drawing Figures

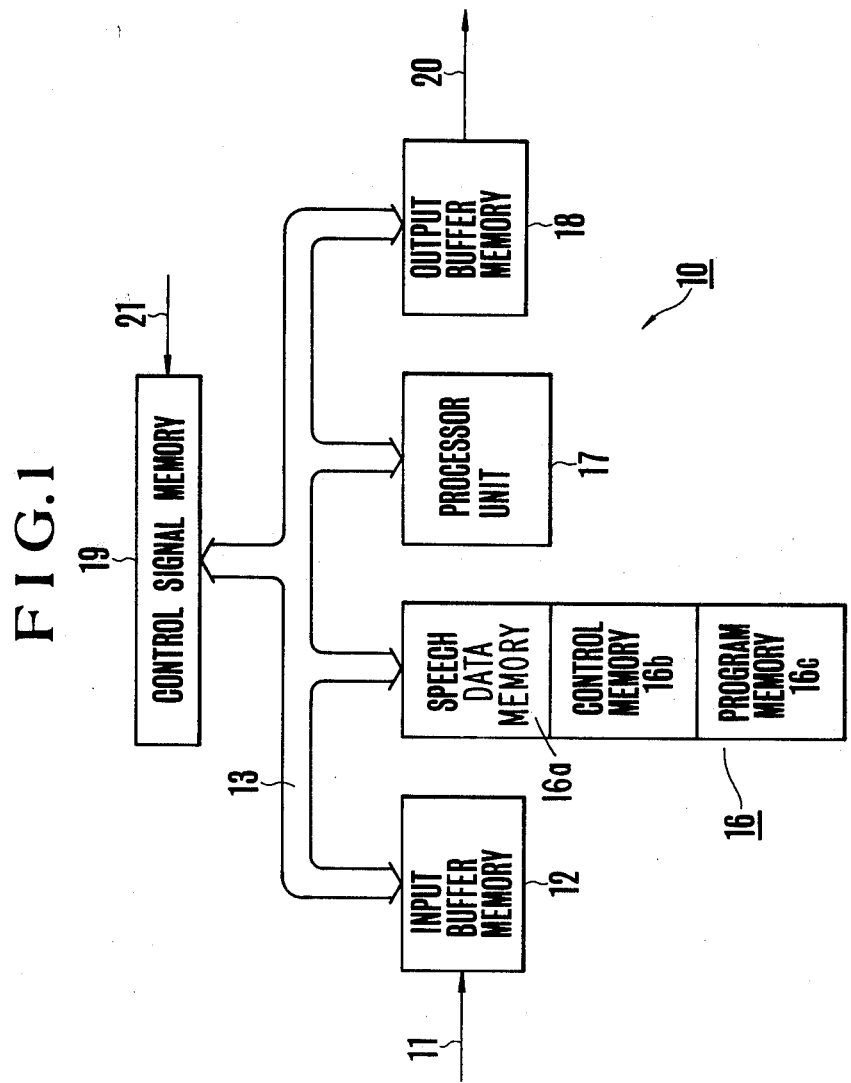

FIG. 3A CLOCK T1

FIG. 3B CLOCK T2

FIG. 3C INPUT BUFFER MEMORY 11

FIG. 3D SPEECH DATA MEMORY 16a

FIG. 3E CONTROL MEMORY 16b

FIG. 3F OUTPUT BUFFER MEMORY 18

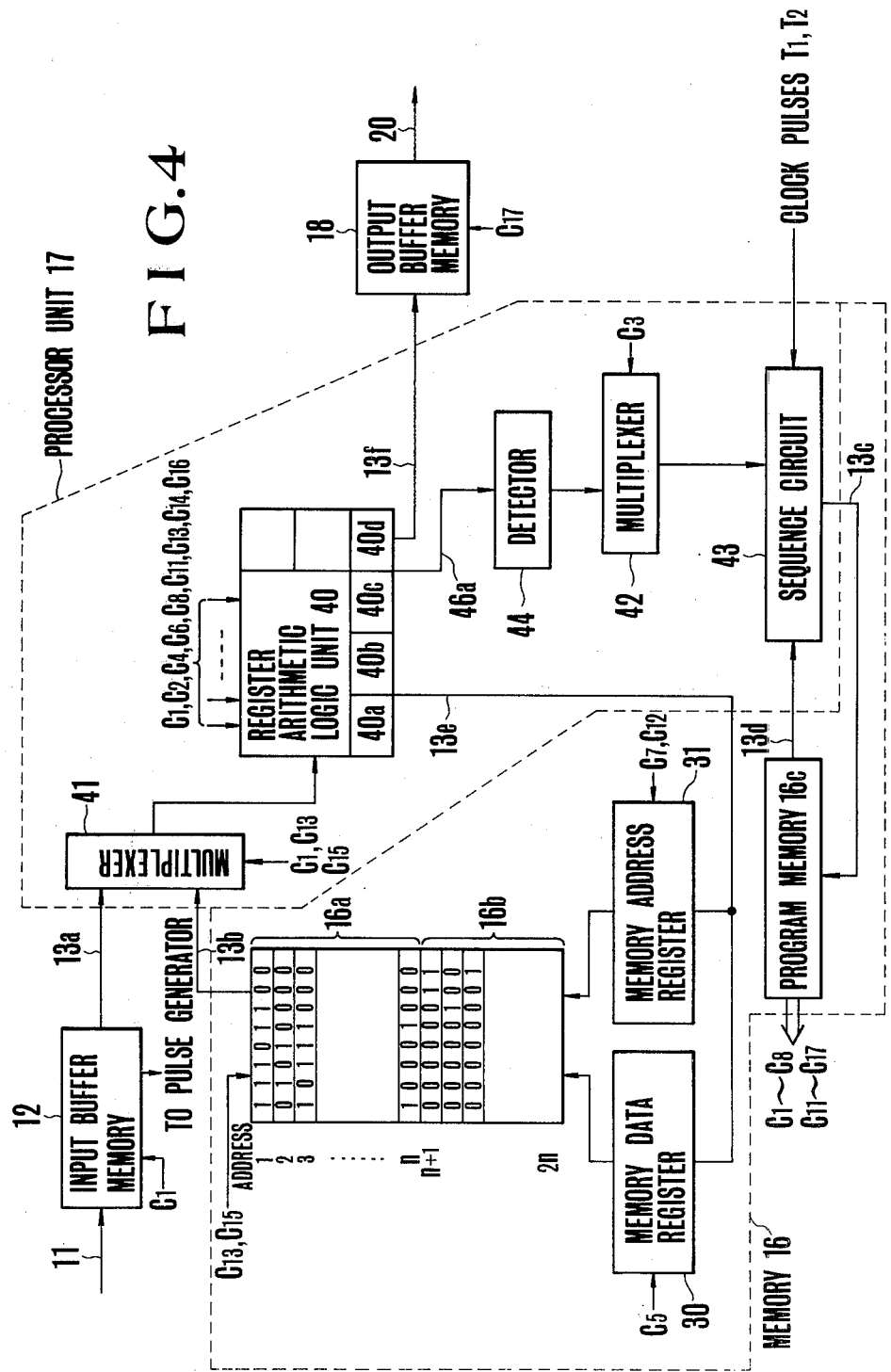

CHANNEL TRANSLATORS FOR USE IN TIME DIVISION DIGITAL EXCHANGERS

BACKGROUND OF THE INVENTION

This invention relates to a channel translator utilized in a time division digital exchanger and comprising a portion of the speech path equipment. Such channel translator functions to shift digital information of a time division channel of an incoming trunk to the other time division channel of an outgoing trunk.

A time division digital exchanger has a number of features; it can exchange digital signals without decoding the same; its component parts can be miniaturized by using modern LSI technique; and various special functions, for example a conference call circuit, can be incorporated into the exchanger. As a result of improvements in technology, time division electronic exchangers having high efficiency and small size can now be manufactured at low cost.

Generally, the speech path equipment of a time division digital exchanger is constituted by a channel translator comprising a time switch, and a space switch which transfers information between different lines. One example of the construction of the speech path equipment is disclosed in a G. Douglas Johnson's paper "No. 4 ESS-Long Distance Switching for the Future", Bell Laboratories Record, Sep. 1973, vol. 51, No. 8, pages 226-232. The channel translator described in this paper is constituted by substituting electronic hardware for changing the connection by link wires which have been used in a space division type exchanger. For this reason, the digital information sent to the channel translator from such digital transmission line as a PCM 24 channel are sequentially written in a speech data memory device by a writing device in synchronism with the clock pulse of the transmission from the speech data memory device, a first read out device operating in synchronism with the writing device is used to read out the content of a control memory device and a second read out device is operated in response to the read out control information thereby reading out an information of a predetermined address by the control information.

However, since in the prior art channel translator described above, the digital transmission line is connected to the speech data memory device via independent writing and read out devices, the operation lacks flexibility thus decreasing the merit caused by the use of a stored program control system for digital exchanger. Thus, for example, as the capacity of the digital exchanger increases it becomes necessary to change the construction of the channel translator, but where the translator is fabricated with hardware as has been the prior art practice, it is necessary to change the design of the translator each time the capacity is changed. For this reason, it is difficult to expand the capacity and/or add new services.

Furthermore, when special purpose hardware is used as above described, the channel translator becomes relatively bulky whereby the manufacturing cost of a channel translator increases due to a special design. Accordingly, it has been difficult to manufacture an economical exchanger having a small capacity.

SUMMARY OF THE PRESENT INVENTION

Accordingly, it is the principal object of this invention to provide a channel translator using a time division digital exchanger to achieve improved flexibility and expandability.

Another object of this invention is to provide a novel channel translator including a time division digital exchanger manufactured using LSI techniques to provide small size and low cost.

According to this invention, there is provided a channel translator for use in a time division digital exchanger of the type wherein digital information containing digitized voice information is assigned to a predetermined channel of a first time division multiplexed digital transmission line, and information assigned to each channel of the first transmission line is reassigned to any channel of a second digital transmission line thereby effecting telephone exchange, characterized in that the channel translator comprises an input buffer memory device for temporarily storing digital information from the first digital transmission line, a speech channel memory device for storing the digital information stored in the input buffer memory device, a control memory device for storing channel translation control information which is used to effect channel translation of the digital information stored in the speech data memory device, an output buffer memory device for temporarily storing digital information read out from the speech data memory device and then sending the digital information to the second digital transmission line, a processor unit which performs an arithmetic operation necessary for transferring digital information from the input buffer memory device to the speech data memory device in synchronism with said predetermined channel of the first digital transmission line and for transferring the digital information from the speech memory device to the output buffer memory device, a program memory device for storing a program for controlling the operation sequence of the various circuit elements described above, and connections for electrically interconnecting said circuit elements.

IN THE DRAWING

FIG. 1 is a block diagram showing the basic construction of a channel translator according to this invention and utilized in a time division digital exchanger;

FIGS. 2A and 2B are graphs showing digital information which is applied to and derived from the channel translator shown in FIG. 1;

FIGS. 3A through 3F are graphs illustrating operation of the channel translator shown in FIG. 1; and FIG. 4 is a block diagram showing the principal components of the channel translator illustrated in FIG. 1.

DETAILED DESCRIPTION OF THE PREFERRED EMBODIMENT

A preferred embodiment of the channel translator 10 shown in FIG. 1 comprises an input buffer memory device 12 which is connected to a trunk that is a digital transmission line 11 to receive therefrom a digital information comprising such digital information as digitized voice information, digit signals as digitized dial numbers and digital control information as originating signals. The digital transmission line 11 is multiplexed on the time division basis and includes 24 channels or time slots, for example, each channel accommodating digital information subjected to PCM (pulse code modulation). In the case of the voice information, one frame corresponding to 24 channels has a length of 125 $\mu$s and each channel has a length of 5.2 $\mu$s.

When the input buffer memory device 12 receives digital information, it temporarily stores the digital information and thereafter the operation of the channel translator is commenced in synchronism with the digital information. The input buffer memory device 12 has a bit capacity corresponding to the amount of information accommodated in respective channels so as to perform serial/parallel translation of the digital information received from the digital translation line.

The output side of the input buffer memory device 12 is connected to a memory device 16, to a processor unit 17, to an output buffer memory device 18, and to a control signal memory device 19 through a bus line 13. The memory device 16 is constituted by an RAM (random access memory) device, for example, comprising a plurality of memory cells which are used for various purposes necessary for the operation of the channel translation. In this example, the first to nth addresses (n is an integer larger than 1) are used to act as a speech data memory device 16a for storing digitized voice signals sent from the input buffer memory device 12, the (n+1)th to 2nth addresses are used to act as a control memory device 16b adapted to store channel translation informations necessary to subject the digitized voice information stored in the speech data memory device 16a to channel translation and to send out the channel translated voice information, whereas (2n+1)th to 4nth addresses are used to act as a program memory device 16c which determines the operation sequence of the speech translator.

Although the memory device further comprises a memory device for storing the digital control information, since such memory device is immaterial to the channel translation operation of this invention, it is not shown.

The purpose of the processor unit 17 is to perform an arithmetic operation necessary to transfer the digitized voice information received by the input buffer memory device 12 to the speech data memory device 16a in synchronism with the operation of a predetermined channel of the digital transmission line 11 and to transfer the digitized information to the output buffer memory device 18 from the speech data memory device 16a in response to the release and execution of the program memory device 16c. The processor unit 17 contains a plurality of registers.

The purpose of the output buffer memory device 18 is to temporarily store quantities of digital voice information which are channel-translated by the memory device for sending out the information to a time division multiplexed digital transmission line; that is, trunk 20 which is different from the aforementioned digital transmission line 11. The buffer memory circuit 18 has a parallel/serial converting function of the signal and the converted signals are sent to the transmission line 20 in synchronism with the operation of the channels of the digital transmission line.

The purpose of the control signal memory device 19 is to temporarily store control information sent from a controller or control information generating device, not shown, of the digital exchanger through a control line 21. The output of this memory device is written into a predetermined address of the control memory device 16b at a predetermined timing.

As shown in FIG. 2A, the digitized voice information is sent to the channel translator 10 from the digital transmission line 11 and a digitized voice information shown in FIG. 2B is sent out as an output. These operations will now be described with reference to FIGS. 3A through 3F. In FIGS. 2A and 2B, digits in parentheses along the time axes designate the channel numbers in the digital transmission line 20 and symbols A, B . . . X shown on the opposite sides of the time axes represent the digitized voice information as assigned to respective channels. These digitized voice signals are produced by sampling a voice signal at a predetermined frequency and then subjecting the sampled signals to pulse code modulation (PCM). For example, in the digital transmission line, the information A sent through channel (1) is channel-translated to channel (3) of the digital transmission line 20, whereas information B transmitted through channel (2) of the channel transmission line 11 is channel-translated to channel (n) of the digital transmission line 20.

Assume now that the channel translation operation of one frame is performed in a time of $T_O$ and that each frame is constituted by n channels, then $T_O/n$ time slots are allocated for each channel. If $n=24$ and $T_O=125$ μs, the length of one time slot would be 5.2 μs. To process the information contained in such channels, two clock pulses $T_1$ and $T_2$ shown in FIGS. 3A and 3B are used. These clock pulses are generated by a pulse generator, not shown, in synchronism with the operation of the channels; that is, time slots of the digital transmission line 11. These pulses have different phases so that they do not overlap each other. The duty cycle of these pulses is determined to be 1/10, for example.

Clock pulse $T_1$ is used to transfer information to the speech data memory device 16a from the input buffer memory device 12 while clock pulse $T_2$ is used to transfer the content of the speech data memory device 16a to the output memory device 18 in accordance with the content of the control memory device 16b.

Consequently, when the content (A) of the channel (1) shown in FIG. 2A is transferred to the speech data memory device 16a, the content (A) of the channel (1) temporarily stored in the input buffer memory device 12 as shown in FIGS. 3C and 3D is transferred to a predetermined address, for example, address 1 of the speech data memory device 16a through the bus line 13 while the clock pulse $T_{11}$ shown in FIG. 3A persists. In the same manner, the contents (B), (C), . . . (X) of the channels (2), (3), . . . (n) which are supplied to the input buffer memory device 12 in an order shown in FIG. 2A are transferred to predetermined addresses, that is, the second to nth addresses of the speech data memory device 16a over the bus line 13 while the clock pulses $T_{12}, T_{13}, \ldots T_{1n}$ shown in FIG. 3A persist. The channel numbers of the digital transmission line 11 are made to correspond to the addresses of the speech data memory device 16a which store the contents of respective channels for the purpose of facilitating the processing. The transfer operation is preformed by the processor unit 17 according to a program stored in the program memory device 16c.

Where the contents of respective channels stored in the speech data memory device 16a are sent out to the time division multiplexed digital transmission line, that is, the outgoing trunk 20 through the output buffer memory device 18, the following operations are performed. As shown in FIG. 2B the content C of channel (3) of FIG. 2A is stored in a channel or time slot (1) of the digital transmission line 20 corresponding to channel (1) shown in FIG. 2A. Consequently, when clock pulse $T_{21}$ shown in FIG. 3B persists, the content (C) of the third address of the speech data memory device 16a is sent to the output buffer memory device 18 via the bus line 13 in accordance with control information (3) in the first address (corresponding to the address of the speech data memory device 16a) of the control memory device 16b. The output buffer memory device 18 sends out this information "C" to the trunk 20 through the channel or time slot (1).

When the clock pulse $T_{22}$ persists, the content (D) in the fourth address of the speech data memory device 16a is transferred to the output buffer memory device 18 through the bus line 13 in accordance with control information (4) in the second address of the control memory device 16b, and the content (D) is then sent out of the outgoing trunk 20 through the channel or time slot (2). In the same manner, the contents in respective addresses of the speech data memory device 16a are sequentially read out, sent to the output buffer memory device 18 and then sent out to trunk 20 through respective channels in accordance with the control signals stored in the third to nth channels of the control memory device 16b.

The operation for storing the information from the digital transmission line in the speech data memory device and the operation for sending out the information to the digital transmission line 20 from the speech data memory device 16a are performed alternately in synchronism with a clock pulse on the transmission line.

This invention has the following advantages. Since the information sent from the time division multiplexed digital transmission line is channel translated by a combination of transfer instructions formed by a program on the assumption that the channel translation operation corresponds to the translation of data between memory devices, it is possible to construct the channel translator with a commercially-available microprocessor. For this reason, different from the prior art channel translator, it is not necessary to use a dedicated writer for cyclically writing the information into a speech data memory device, a dedicated reader for cyclically reading out the information from the speech data memory device and a dedicated control memory device for determining the order of reading out the information from the speech data memory device. The use of a commercially-available microprocessor as the channel processor miniaturizes the translator and the space occupied thereby in an electronic telephone exchanger, thereby reducing its cost. Furthermore, since the channel translation operation is processed by a program, it is possible to readily vary the capacity of the speech memory device according to the number of channels of the digital transmission line. For this reason, where an originating call of a number exceeding a predetermined number is made for a digital exchanger utilizing the channel translator, by merely changing the frame period, the channel translator can perform channel translation without missing any originating call. In this case, the range in which the frame period can be varied is determined by the degree of understanding of the reproduced voice.

Furthermore, according to this invention since the digitized voice information is stored in the speech data memory device for processing the channel translation operation by a program, it is possible to determine the actual state of the speech path by directly accessing it from a direct control device without using any speech map as in conventional systems. For this reason, the invention can be advantageously applied to a distributed control exchanger system wherein the control function is divided among a number of control subsystems.

By processing the channel translating operation with a program, it is possible to readily add a conference telephone capability to the telephone system by mere modification of the program, thus increasing the flexibility and expandability of the telephone system.

FIG. 4 shows one example of the detailed construction of the channel translator embodying the invention in which circuit elements corresponding to those shown in FIG. 1 are designated by the same reference numerals. Memory device 16 which comprises a speech data memory device 16a, a control memory device 16b, and a program memory device 16c like that shown in FIG. 1, further includes a memory data register (MDR) 30 and a memory address register (MAR) 31 for making access to the speech data memory device 16a and the control memory device 16b. Although the program memory device 16c is shown in a block independent of the other memory devices for the sake of description, it should be understood that the program memory device 16c contains data which decodes the program for producing control information $C_1$-$C_8$ and $C_{11}$-$C_{17}$ which are used to control the operations of various elements.

The processor unit 17 includes a register arithmetic logic unit (RALU) 40, multiplexers 41 and 42, a sequence circuit 43 and a detector 44. The multiplexer 41 controls the passage of signals sent from the input buffer memory device 12, the speech data memory device 16a and the control memory device 16b over the bus lines 13a and 13b under the control of control signals $C_1$, $C_{13}$ and $C_{15}$, and the output of the multiplexer 41 is supplied to RALU 40. The RALU 40 is provided with a plurality of registers or counters, but only the "ith" counter 40a, a pair of preset counters 40b and 40c, and a register 40d are shown; these counters being the ones directly related to the operation of this invention. Counter 40a counts the number of channels or time slots containing the digital signals sent from the input buffer memory device, whereas the preset counter 40b contains a value to be compared with the count of counter 40a, said value representing the number of channels that comprise one frame of the digital transmission lines 11 and 20 and equal to n (an integer), for example 24. The preset counter 40c contains a value which initializes the count of the counter 40a to a "1" whenever the count of counter 40a exceeds n. The register 40d acts to temporarily memorize the information from the input buffer memory device 12, the speech data memory device 16a or the control memory device 16b. One of the outputs of RALU 40 is coupled to the output buffer memory device 18, the other output is coupled to the memory data register 30 and the memory address register 31 of the memory device 16, and yet another output is coupled to the detector 44. The operation of RALU 40 is controlled by control signals $C_1$, $C_2$, $C_4$, $C_6$, $C_8$, $C_{11}$, $C_{13}$, $C_{14}$ and $C_{16}$ sent from the program memory device 16c. The output of the detector 44 is supplied to the sequence circuit 43 via multiplexer 42 which is controlled by a control signal $C_3$. The sequence circuit 43 makes an access to the program memory device 16c in response to clock pulses $T_1$ and $T_2$ which are supplied from a source of pulse (not shown) in synchronism with the digital information supplied to the buffer memory device 12 thereby initiating its sequence operation for controlling the operation of the program memory device 16c.

The channel translator shown in FIG. 4 operates as follows. In the absence of any digital information sent from the digital transmission line, various elements of the processor unit 17 are in the reset or initialized state. The program memory device 16c is constructed to start its programming operation from its start position.

Under these conditions when the digital information of the PCM 24 channels shown in FIG. 2A are sent to the input buffer memory device 12 through the digital transmission line, the input buffer memory device 12 causes a pulse generator not shown to send signals $T_1$ and $T_2$ to the sequence circuit 43 of the processor unit 17. As a consequence, the sequence circuit 43 supplies to the program memory device 16c through bus line 13a a signal which causes the program memory device 16c to start its channel translating operation.

Thereafter, the program memory device 16c sends a control signal $C_1$ to the input buffer memory device 12, the multiplexer 41 and the RALU 40. At the same time the program memory device 16c sends through a bus line 13d to the sequence circuit 43 a signal that causes it to perform its sequence operation. As a consequence, the content of the input buffer memory device 12 is temporarily stored in register 40d of RALU 40 via the multiplexer 41. At the same time, one is added to the count of counter 40a of RALU 40. Counter 40a is used to memorize the channel number of the information presently being processed, and a one is added to its count each time information is supplied to the register 40d from the input buffer memory device 12.

After the counting operation of counter 40a described above is completed, the program memory device 16c sends a control signal $C_2$ to RALU 40 causing it to compare the count of counter 40a with a maximum value "n" of the address number preset in the register 40b. When the result of the comparison shows that the count of the counter is smaller than "n", RALU 40 produces an output "0" on a line 46a, and this output is detected by the detector 44. The output of detector 44 is supplied to the sequence circuit 43 through multiplexer 42 when it receives control signal $C_3$. The sequence circuit 43 makes an access to the next instruction of the program memory device 16c to send control signal $C_4$ to RALU 40 which in turn sends the content of register 40d to the memory data register 30 via bus line 13e. The memory data register 30 then stores the received content of register 40d under the control of control signal $C_5$ sent from the program memory device 16c.

When supplied with control signal $C_6$ from the program memory device 16c, RALU 40 sends the count of the counter 40a to the memory address register 31 via bus line 13e. When supplied with a control signal $C_7$ from the program memory device 16c, the memory address register 31 stores the content of the memory data register 30 in a predetermined address, for example, the first address of the speech data memory device 16a, which is determined by the content of the program memory device 16c. Consequently, the content stored in the first address of the speech data memory device 16a (A shown in FIG. 2) is the data transmitted through channel (1) of the transmission line 11. FIG. 4 shows that the data "11101100" is stored in the first address as the content of channel (1).

The operation described above is repeated each time digital information is sent to the input buffer memory 12 from the digital transmission line 11, and when the count of counter 40a of RALU 40 exceeds "n", the RALU 40 sends its output "1" to detector 44 through line 46a thus causing the detector 44 to supply its output to the sequence circuit 43 through multiplexer 42 under the control of control signal $C_3$ from the program memory device 16c. Then, the sequence circuit 43 makes an access to the program memory device 16c causing it to supply control signal $C_8$ to RALU 40, thus restoring the count of counter 40a to "1" according to the count of the preset counter 40c. The content of register 40d at this time is not changed, the content showing the content in channel (1) of the digital information of the next frame.

The operation of reading information stored in the speech data memory device 16a and sending the read out information to the outgoing trunk 20 through the output buffer memory device 18 will now be described. This operation is alternately performed with the operation of writing the output of the input buffer memory device 12 in the speech data memory device 16a.

It is now assumed that in response to a clock pulse $T_1$ supplied to the sequence circuit 43 from a clock pulse generator (not shown), information in the channel or time slot (1) of the digital transmission circuit 11 has just been stored in the first address of the speech data memory device 16a. Thereafter, clock pulse $T_2$ is supplied to the sequence circuit 43 from the clock pulse generator with the result that the sequence circuit 43 changes its operation from writing to reading. Thus, the sequence circuit 43 makes an access to the program memory device 16c via bus line 13c to cause the program memory device 16c to send a control signal $C_{11}$ to the RALU 40. As a consequence, RALU 40 adds "n" to the count of counter 40a and the sum is read out as address information which is sent to the memory address register 31 over a line 13e.

When the memory address register 31 receives a control signal $C_{12}$ from the program memory device 16c, the memory address register 31 sends out the content of the (i+n)th address of the memory device; that is, the content "00000011" of the ith address (in this example, the first address) of the control memory device 16b in accordance with the address information described above. The content of the first address of the control memory device functions to designate an address containing information to be read out from the speech data memory device 16a. The read out signal is supplied to register 40a of RALU 40 through the multiplexer 41 under the control of a control signal $C_{13}$ sent from the program memory device 16c. At this time the register 40d is storing an address designation signal (3) in the form of binary information "00000011" for the speech data memory device 16a to be read out next time.

Then, in response to control signal $C_{14}$ supplied from the program memory device 16c, an address designation information "00000011" of the speech data memory device 16a to be read out next time is supplied to the memory address register 31 in accordance with the content of the register 40d. The content "10111000" in the third address of the speech data memory device 16a is read out by a control signal $C_{15}$ produced by the program memory device 16c and then sent to the register 40d of the RALU 40 via a bus line 13b and the multiplexer 41. In response to the control signal $C_{16}$ sent from the program memory device 16c, the content of the register 40d is sent to the output buffer register 18 via bus line 13f and temporarily stored therein. The content of the output buffer register 18 is sent to a channel or time slot (1) of the digital transmission line 20 by control signal $C_{17}$ sent from the program memory device 16c.

The operations described above are performed during an interval for designating one channel or one time slot shown in FIGS. 3A and 3B. In other channels, after writing information into the speech data memory device 16a from the input buffer memory device 12 in accordance with the clock pulse $T_1$, the content of the output buffer register 18 is sent to the digital transmission line 20 each time clock pulse $T_2$ is supplied to the sequence circuit 43.

It should be understood that the invention is not limited to the specific embodiment described above, and that various changes and modifications will be obvious to one skilled in the art. Thus for example, although only one channel translator is shown, a combination of a plurality of channel translators may be used for a speech channel group of large capacity.

Furthermore, in the illustrated embodiment, although the channel translation is performed between different trunks, i.e., different digital transmission lines, the channel translation may be made for the same trunk. The information contained in respective channels may be pure digital data not containing digitized analog information. Furthermore, the digital information of a type other than PCM data may be used.

What is claimed is:

1. A channel translator for use in a time division digital exchanger of the type wherein digital information containing digitized voice information assigned to a predetermined channel of a first time division multiplexed digital transmission line is reassigned to any channel of a second digital transmission line thereby effecting telephone exchange, said channel translator comprising:
   an input buffer memory device for temporarily storing digital information received from the first digital transmission line;
   a speech data memory device for storing the digital information previously stored in said input buffer memory device;
   a control memory device for storing channel translation control information which is used to effect channel translation of said digital information stored in said speech data memory device;
   an output buffer memory device for temporarily storing digital information read out from said speech data memory device and then sending said digital information to said second transmission line;
   a program memory device for storing a program for controlling the operational sequence of the various circuit elements described above;
   a processor means adapted to directly access each of said memory devices under the control of said program memory device for reading digital information stored in said input buffer memory device to transfer it to said speech data memory device in synchronism with said predetermined channel of said first digital transmission line and for transferring said digital information from said speech data memory device to said output buffer memory device; and
   means for electrically connecting said circuit elements.

2. A channel translator as recited in claim 1 wherein said speech data memory device, said control memory device and said program memory device are embodied in a single memory means, and said input buffer memory device, said output buffer memory device and said memory means are interconnected by bus lines.

3. A channel translator as recited in claim 1 wherein said processor means includes an arithmetic logic unit for performing the arithmetic operation necessary to cause the desired transfers of digital information.

4. A channel translator as recited in claim 3 wherein said processor means further includes a multiplexer for converting digital information serially output from said input buffer memory device into parallel output form for input to said speech data memory device and for reading out and converting the digital information stored in parallel in said speech data memory device into a serial form different than that of the information received from said first transmission line.

5. A channel translator comprising:
   input buffer means for receiving and temporarily storing an input frame of digital data including a series of quantities of channel data arranged in a predetermined order;
   output buffer means;
   first memory means having a plurality of discrete storage sites each adapted for storing one of said quantities of channel data;
   second memory means for storing a plurality of discrete quantities of channel address information, each corresponding to one of said storage sites;
   processing means for coupling the output of said input buffer means to said first memory means during first periods of time and for coupling said first memory means to said output means during second periods of time; and
   third memory means containing a series of instructions for controlling the operation of said input buffer means, said output buffer means, said first memory means, said second memory means and said processing means in accordance with a predetermined sequence such that during said first periods of time the quantities of channel data in said input frame are coupled from said input buffer means into corresponding storage sites of said first memory means and such that during other periods of time, the stored channel data is read out of said storage sites in an order determined by the instructions contained in said third memory means and is coupled to said output buffer means for transmission.

6. A channel translator as recited in claim 5 wherein said processing means causes said frame of digital data to be serially read out of said input buffer means in said predetermined order with each said quantity of channel data being input to a different storage site of said first memory means during time separated periods and causes the quantities of data stored in said first memory means to be read out in a different order during the times separating said time separated periods.

7. A channel translator as recited in claim 6 wherein said processing means includes multiplexing means for converting the serial frame of data into a plurality of separate channels of data for parallel input to said first memory means and for converting the parallel output of said first memory means into a different serial form for input to said output buffer means.

8. A channel translator as recited in claim 5 wherein said processing means includes an arithmetic logic unit for determining when a complete frame of channel data has been loaded into said first memory means and when a complete frame of translated data has been loaded into said output buffer means.

* * * * *